(12) United States Patent
Sniezko et al.

(10) Patent No.: US 7,706,689 B2
(45) Date of Patent: Apr. 27, 2010

(54) FORWARD BASEBAND DIGITALIZATION

(75) Inventors: Oleh Sniezko, Highlands Ranch, CO (US); Krzysztof Pradzynski, Santa Clara, CA (US); Guy Sucharczuk, Sunnyvale, CA (US); Peter Lau, Freemont, CA (US); Charles Barker, Sunnyvale, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 847 days.

(21) Appl. No.: 11/150,908

(22) Filed: Jun. 13, 2005

(65) Prior Publication Data

US 2005/0286556 A1 Dec. 29, 2005

Related U.S. Application Data

(60) Provisional application No. 60/579,547, filed on Jun. 14, 2004.

(51) Int. Cl.
*H04J 14/02* (2006.01)

(52) U.S. Cl. ........................................... 398/72

(58) Field of Classification Search .............. 398/67, 398/72

See application file for complete search history.

(56) References Cited

U.S. PATENT DOCUMENTS

| | | | |
|---|---|---|---|
| 6,041,076 A | 3/2000 | Franchville et al. | |
| 6,147,786 A | 11/2000 | Pan | |
| 6,356,369 B1 | 3/2002 | Farhan | |
| 6,462,851 B1* | 10/2002 | West, Jr. | 398/141 |
| 6,519,773 B1* | 2/2003 | Ahmed et al. | 725/118 |
| 2002/0010942 A1* | 1/2002 | Howald | 725/121 |
| 2002/0031083 A1 | 3/2002 | Jin | |
| 2002/0093966 A1* | 7/2002 | Liva et al. | 370/400 |
| 2002/0136203 A1* | 9/2002 | Liva et al. | 370/352 |
| 2003/0110509 A1* | 6/2003 | Levinson et al. | 725/121 |

FOREIGN PATENT DOCUMENTS

WO     WO 99/43108     8/1999

OTHER PUBLICATIONS

Weik, Martin A. "Ethernet," "multiplexing," "quadrature phase-shift keying," "space division multiplexing." Fiber Optics Standard Dictionary. 3rd ed. 1997.*
ISR from corresponding PCT/US2005/020924.
Written Opinion of the ISA, Mar. 11, 2005 (Nov. 3, 2005).

* cited by examiner

*Primary Examiner*—Leslie Pascal
(74) *Attorney, Agent, or Firm*—John Bruckner PC

(57) ABSTRACT

Methods and apparatus are described for forward baseband digitalization. A method includes receiving a forward baseband digital optical signal from an optical fiber; transforming the forward baseband digital optical signal to a forward analog electrical signal; transmitting the forward analog electrical signal on an electrical conductor; receiving a reverse analog electrical signal on the electrical conductor; transforming the reverse analog electrical signal to a reverse digital baseband optical signal; and transmitting the reverse digital baseband optical signal. An apparatus includes a forward baseband digital optical signal receiver; a forward circuit coupled to the forward baseband digital optical signal receiver, the forward circuit transforming a forward baseband digital optical signal to a forward analog electrical signal; a forward analog electrical signal transmitter coupled to the forward circuit; a reverse analog electrical signal receiver; a reverse circuit coupled to the reverse analog electrical signal receiver, the reverse circuit transforming a reverse analog electrical signal to a reverse digital baseband optical signal; and a reverse baseband digital transmitter coupled to the reverse circuit.

22 Claims, 3 Drawing Sheets

FORWARD BASEBAND DIGITALIZATION

CROSS-REFERENCE TO RELATED APPLICATION

This application is related to, and claims a benefit of priority under 35 U.S.C. 119(e) from copending provisional patent application U.S. Ser. No. 60/579,547, filed Jun. 14, 2004, the entire contents of which are hereby expressly incorporated herein by reference for all purposes.

BACKGROUND INFORMATION

1. Field of the Invention

An embodiment of the invention relates generally to the field of data networking. More particularly, an embodiment of the invention relates to methods and apparatus for forward baseband digitalization.

2. Discussion of the Related Art

Prior art advanced broadband networks are known to those skilled in the art. For instance, a conventional advanced broadband network typically includes a headend, a number of hubs, and a larger number of nodes through which a still larger number of subscribers are serviced.

A problem with this technology has been related to the difficulty of achieving highly linear transmission over short and long fiber links at affordable cost. The technology commonly referred to as directly modulated 1310 nm analog lasers for 50 to 860 MHz bandwidth is distance limited to 40 km and loss budget limited to 15-18 dB and expensive at high output levels that allow for such distant locations to be reached. The technology commonly referred to as externally modulated 1550 nm optical analog transmitters for 50 to 860 MHz bandwidth is relatively very expensive for all distances and practically not applicable for distances in excess of 100 km. Therefore, what is required is solution that allows for much longer optical links at affordable cost and at the same or better performance.

Another problem with this technology has been that several links cascaded add cumulatively interference levels. Therefore, what is also required is a solution that allows for cascading OEO signal regenerators without signal degradation.

One unsatisfactory approach to overcoming this distance limitations involves, bandwidth splitting and using several separate transmitters to transmit much lower bandwidth, ideally within one frequency octave. However, a disadvantage of this approach is that it increases the cost of the link by the factor of two or higher. Another unsatisfactory approach for overcoming high loss budget with 1550 nm technology is to use optical amplification of the optical signal. However, a disadvantage of this approach is significant cost increase at low gains in loss budget and at measurable performance degradation. Therefore, what is also needed is a solution that meets the above-discussed requirements in a more cost-effective manner.

Heretofore, the requirements of long distance or high loss budget links at affordable cost without performance degradation, referred to above have not been fully met. What is needed is a solution that simultaneously meets all of these requirements.

SUMMARY OF THE INVENTION

There is a need for the following embodiments of the invention. Of course, the invention is not limited to these embodiments.

According to an embodiment of the invention, a process comprises: receiving a forward baseband digital optical signal from an optical fiber; transforming the forward baseband digital optical signal to a forward analog electrical signal; transmitting the forward analog electrical signal on an electrical conductor; receiving a reverse analog electrical signal on the electrical conductor; transforming the reverse analog electrical signal to a reverse digital baseband optical signal; and transmitting the reverse digital baseband optical signal. According to another embodiment of the invention, a machine comprises: a forward baseband digital optical signal receiver; a forward circuit coupled to the forward baseband digital optical signal receiver, the forward circuit transforming a forward baseband digital optical signal to a forward analog electrical signal; a forward analog electrical signal transmitter coupled to the forward circuit; a reverse analog electrical signal receiver; a reverse circuit coupled to the reverse analog electrical signal receiver, the reverse circuit transforming a reverse analog electrical signal to a reverse digital baseband optical signal; and a reverse baseband digital transmitter coupled to the reverse circuit.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
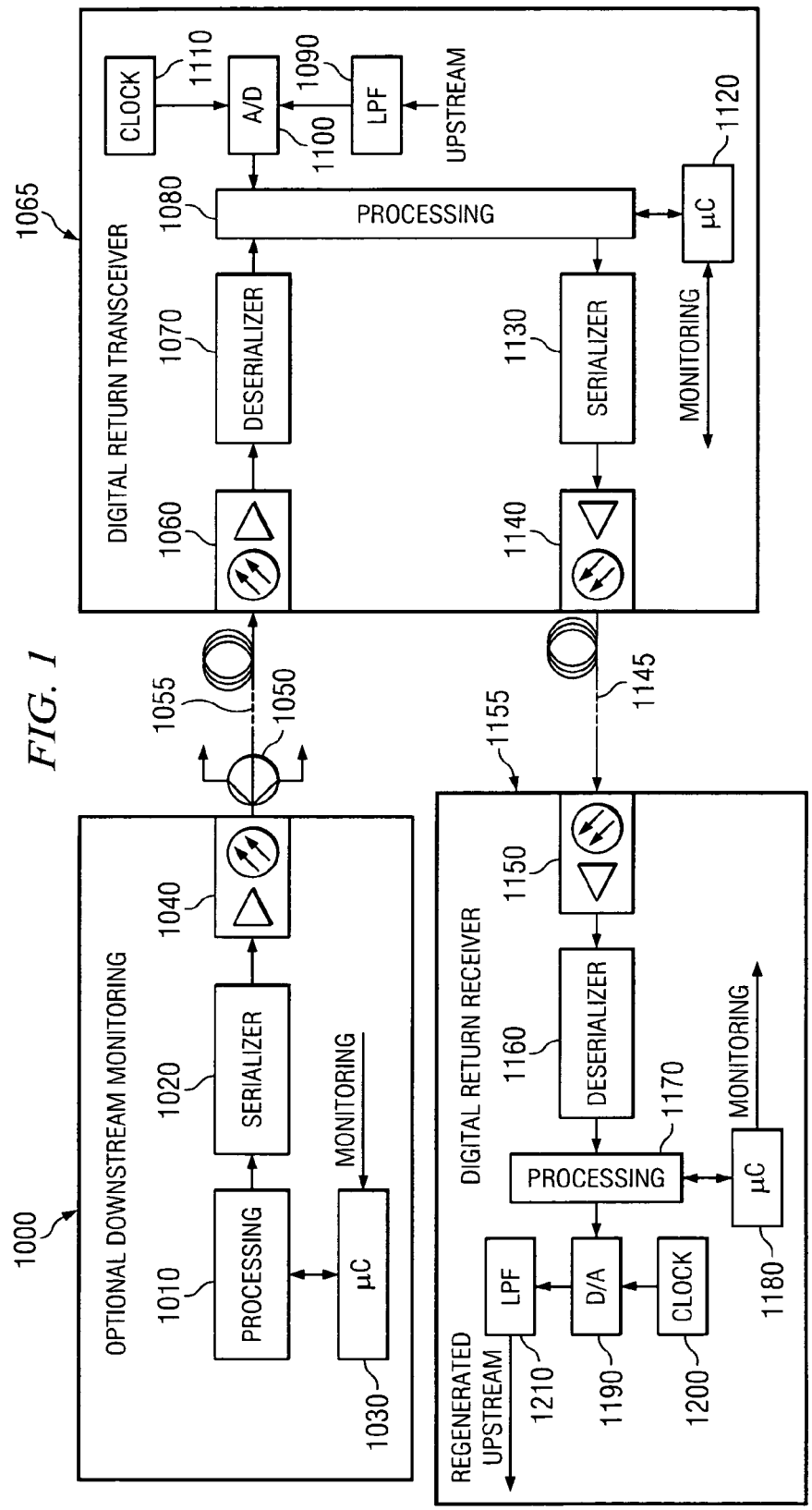
FIG. 1 is a block schematic view of a network architecture with downstream monitoring, representing an embodiment of the invention.

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

The below-referenced U.S. Patents and U.S. Patent Applications disclose embodiments that are useful for the purposes for which they are intended. The entire contents of U.S. Pat. No(s). 6,452,708; 6,501,871; and 6,618,522 are hereby expressly incorporated by reference herein for all purposes. The entire contents of Patent Cooperation Treaty Publication Nos. WO 01/052455; WO 02/021736; WO 02/021737; WO 02/091031; and WO 03/081302 are hereby expressly incorporated by reference herein for all purposes. The entire contents of U.S. Ser. Nos. 09/657,996, filed Sep. 8, 2000; and 10/197,016, filed Jul. 17, 2002 are hereby expressly incorporated by reference herein for all purposes.

In general, the context of an embodiment of the invention can include a data network. The context of an embodiment of the invention can include a cable television network. The context of an embodiment of the invention can also include Ethernet networking.

The invention can include an optical network architecture for transporting forward analog signals in baseband digital form after analog to digital conversion and converting them to native analog signal at a location close to the customer, whether on premises or in the hybrid fiber coaxial and fiber networks. The invention can thereby provide low incremental cost digitized downstream distribution.

The invention can include baseband/wideband converting the forward analog optical signal to digital at a hub and converting the forward digital optical signal to analog at a node, optionally in the context of a hybrid fiber coax network. The baseband/wideband conversion can be defined as including a plurality of frequency octaves, preferably many frequency octaves. The invention can forward digitalize signals, for example, from approximately 50 MHz to approximately 550 MHz or from approximately 50 MHz to approximately 870 MHz. Thus, this aspect of the invention includes digital-to-analog forward conversion at the node (minifibernode). In one embodiment, the invention can include conveying from approximately 15 to approximately 30 forward channels. In another, or the same, embodiment, the invention can includes carrying reverse digital data up to approximately 100 MHz. Although this extended reverse upper frequency range may involve more attenuation is has the significant advantage of less noise. It is important to note that the same extended bandwidth reverse chips found in some legacy nodes (minifibernodes) can provide the digital-to-analog downstream conversion. The baseband/wideband forward digitalization of the invention provides significant commercial advantages and is much more than just QAM digitalization.

The invention can include the use of alternative sub-division schemes. The invention can include sub-dividing the forward throughput into multiple bandwidths (aka chunks). In one embodiment, the invention can sub-divide the forward throughput into one or more portion(s) that is(are) baseband digitized and one or more portion(s) that is(are) analog. In this fractional forward baseband digitalization embodiment, these portions are subsequently recombined at the node. For instance, an embodiment of the invention can divide an input from approximately 50 MHz to approximately 870 MHz into a first portion of from approximately 50 MHz to approximately 550 MHz for forward baseband digitalization and a second portion of from approximately 550 MHz to approximately 870 MHz for analog.

The invention can include reducing the required forward digital bandwidth by a) under sampling; b) space division multiplexing; and/or c) frequency down conversion or broadband conversion. For instance, given a forward signal domain of from approximately 0 MHz to approximately 200 MHz, the invention can reduce the necessary sampling frequency from approximately 400 MHz to approximately 200 MHz by defining two sub-sections including a first sub-section of from approximately 0 MHz to approximately 100 MHz corresponding to the domain of from approximately 0 MHz to approximately 100 MHz and a second sub-section of from approximately 0 MHz to approximately 100 MHz corresponding to the domain of from approximately 100 MHz to approximately 200 MHz. This embodiment of the invention provides significant advantages with respect to expense, the required speed of the implementation circuitry and/or software, the required bandwidth to implement the embodiment, and the necessary sampling frequency, thereby yielding major efficiency improvements.

The invention can include subdividing the forward throughput into bandwidth portions that are equal to the reverse bandwidth of one or more minifibernodes (that may already be deployed). For instance, an embodiment of the invention can subdivide the forward throughput into multiple portions of from approximately 0 MHz to approximately 42 MHz, or from approximately 0 MHz to approximately 45 MHz, or from approximately 0 MHz to approximately 96 MHz, or from approximately 0 MHz to approximately 100 MHz. This embodiment of the invention is very efficient with regard to utilizing existing legacy equipment (e.g., previously deployed minifibernodes) and is, therefore, a commercially important aspect of the invention.

The invention can optionally include providing Ethernet in the forward direction via the forward digitized signals. The invention can include alternative ways to allocate the Ethernet data at the hub and alternative ways to recover it at the node.

Referring to FIG. 1, a downstream transmitter block 1000 is coupled to a digital return transceiver block 1065. The digital return transceiver block 1065 is coupled to a digital return receiver block 1155.

Still referring to FIG. 1, a processing block 1010 is coupled to a serializer block 1020. A monitoring block uC 1030 is also coupled to the processing block 1010. The serializer block 1020 is coupled to an optical transmitter block 1040. The optical transmitter block 1040 is coupled to fan-out (e.g., splitter, router, etc.) block 1050. The fan-out block 1050 is coupled to an optical link 1055. The optical link 1055 is coupled to an optical receiver block 1060. The optical receiver block 1060 is coupled to a deserializer block 1070. The deserializer block 1070 is coupled to a processing block 1080. An upstream data signal is provided to a low pass filter 1090. The low pass filter 1090 is coupled to an analog-to-digital converter 1100. A clock 1110 is also coupled to the analog-to-digital converter 1100. The analog-to-digital converter 1100 is coupled to the processing block 1080. A monitoring block uC 1120 is also coupled to the processing block 1080. The processing block 1080 is coupled to a serializer block 1130. The serializer block 1130 is coupled to an optical transmitter block 1140. The optical transmitter 1140 is coupled to an optical link 1145. The optical link 1145 is coupled to an optical receiver block 1150. The optical receiver block 1150 is coupled to a deserializer block 1160. The deserializer block 1160 is coupled to a processing block 1170. A monitoring block uC 1180 is also coupled to the processing block 1170. The processing block 1170 is coupled to a digital-to-analog converter 1190. A clock 1200 is also coupled to the digital-to-analog converter 1190. The digital-to analog converter 1190 is coupled to a low pass filter 1210, thereby providing a regenerated upstream signal.

Figure 2:
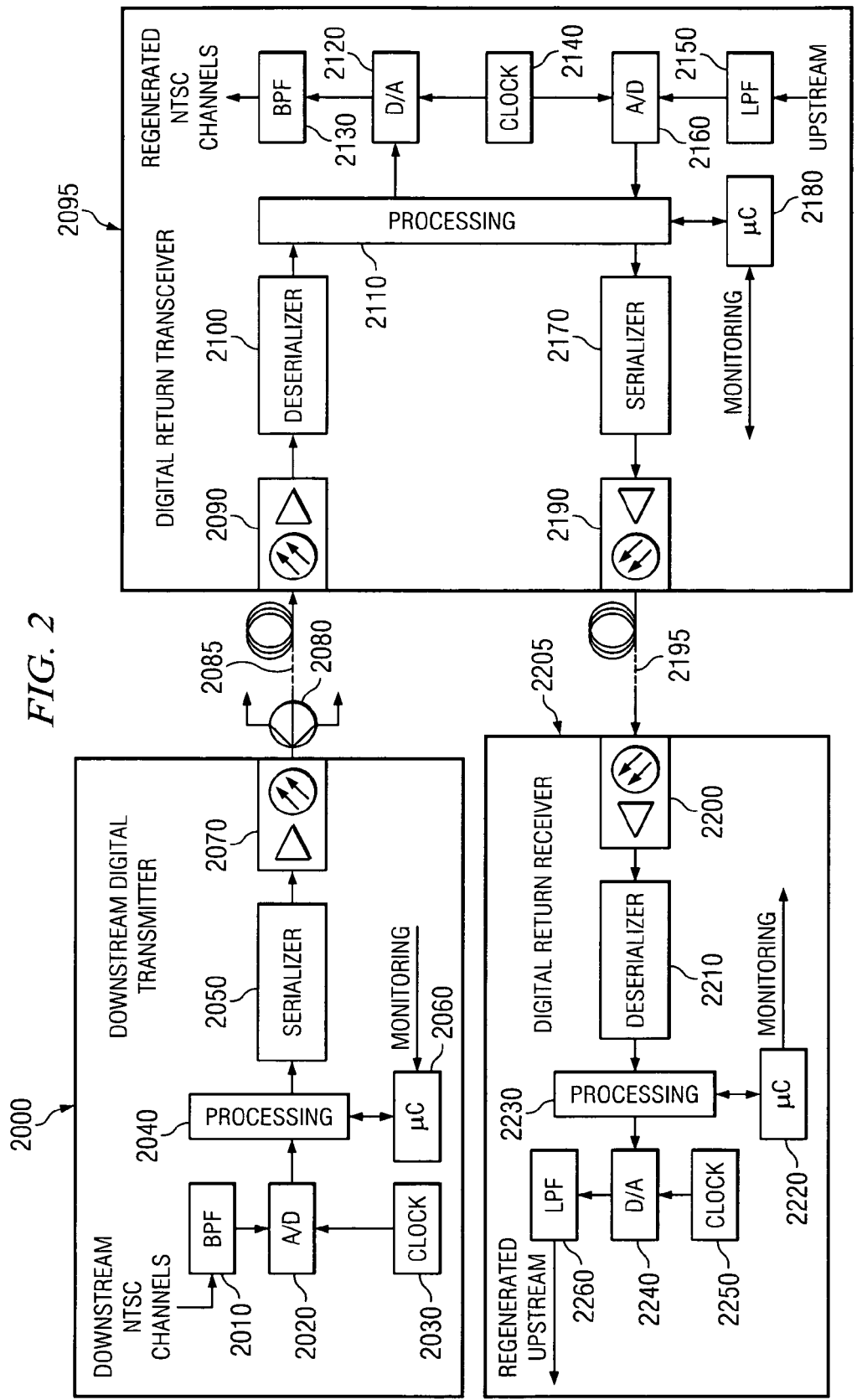
FIG. 2 is a block schematic view of a network architecture with a downstream digital transmission and downstream monitoring, representing an embodiment of the invention.
Figure 3:
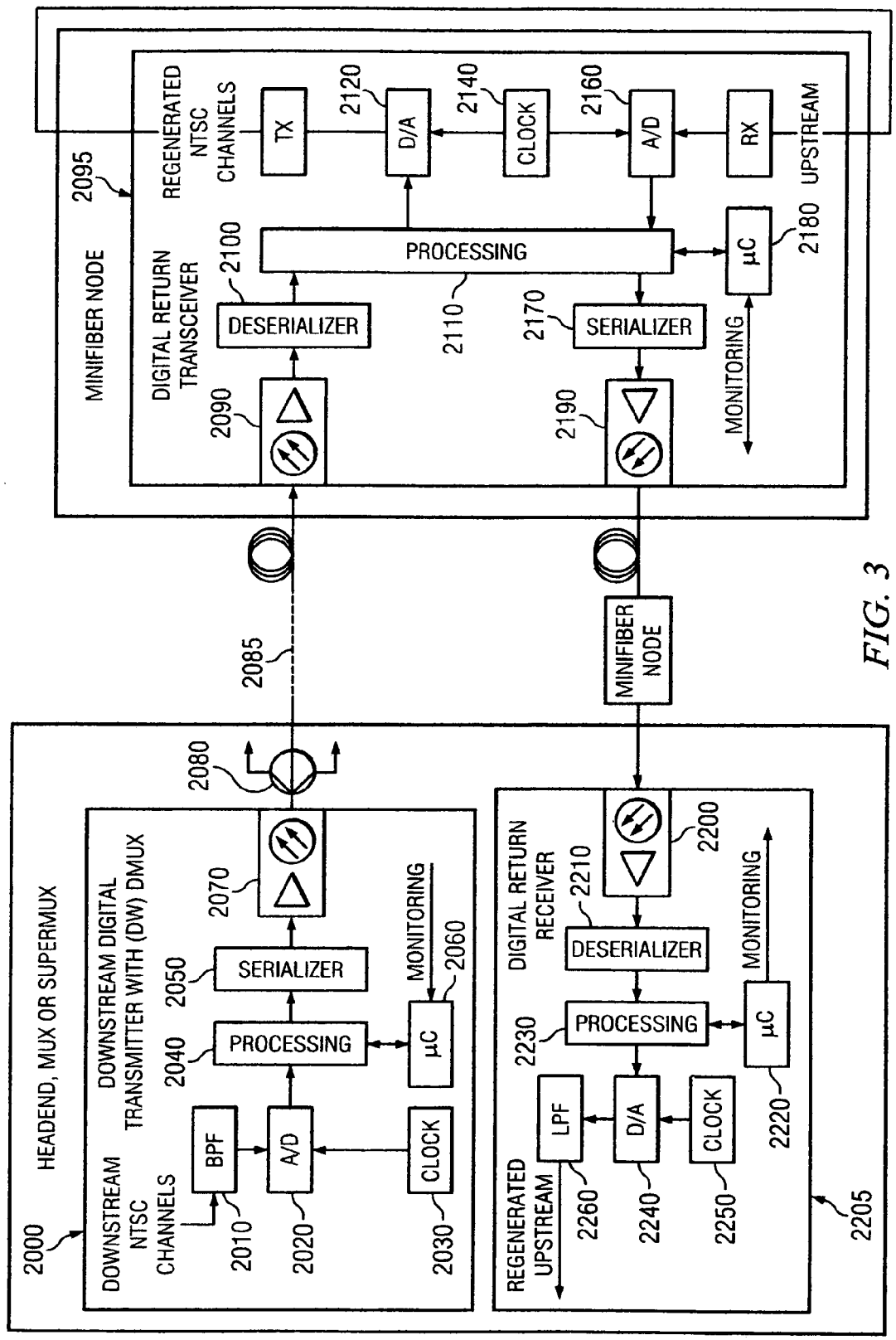
FIG. 3 is a block schematic view of a network architecture with a downstream digital transmission and downstream monitoring, representing an embodiment of the invention.

Referring to FIG. 2, a downstream digital transmitter 2000 is coupled to a digital return transceiver 2095. The digital return transceiver 2095 is coupled to a digital return receiver 2205.

Still referring to FIG. 2, a downstream data signal including NTSC (National Television System Committee) channels is provided to a band pass filter 2010. The band pass filter 2010 is coupled to an analog-to-digital converter 2020. A clock 2030 is also coupled to the analog-to-digital converter 2020. The analog-to-digital converter 2020 is coupled to a processing block 2040. The processing block 2040 is coupled to a serializer block 2050. A monitoring block uC 2060 is also coupled to the processing block 2040. The serializer block 2050 is coupled to an optical transmitter block 2070. The optical transmitter block 2070 is coupled to fan-out (e.g., splitter, router, etc.) block 2080. The fan-out block 2080 is coupled to an optical link 2085. The optical link 2085 is coupled to an optical receiver block 2090. The optical receiver block 2090 is coupled to a deserializer block 2100. The deserializer block 2100 is coupled to a processing block 2110. The processing block is coupled to a digital-to-analog converter 2120. The digital-to-analog converter 2120 is coupled to a band pass filter 2130, thereby providing regenerated NTSC channels. The digital-to-analog converter 2120 is also coupled to a clock 2140. An upstream data signal is provided to a low pass filter 2150. The low pass filter 2150 is coupled to an analog-to-digital converter 2160. The clock 2140 is also coupled to the analog-to-digital converter 2160. The analog-to-digital converter 2160 is coupled to the processing block 2110. A monitoring block uC 2180 is also coupled to the processing block 2110. The processing block 2110 is coupled to a serializer block 2170. The serializer block 2170 is coupled to an optical transmitter block 2190. The optical transmitter 2190 is coupled to an optical link 2195. The optical link 2195 is coupled to an optical receiver block 2200. The optical receiver block 2200 is coupled to a deserializer block 2210. The deserializer block 2210 is coupled to a processing block 2230. A monitoring block uC 2220 is also coupled to the processing block 2230. The processing block 2230 is coupled to a digital-to-analog converter 2240. A clock 2250 is also coupled to the digital-to-analog converter 2240. The digital-to analog converter 2240 is coupled to a low pass filter 2260, thereby providing a regenerated upstream signal.

An embodiment of the invention can also be included in a kit. The kit can include some, or all, of the components that an embodiment of the invention includes. The kit can be an in-the-field retrofit kit to improve existing systems that are capable of incorporating an embodiment of the invention. The kit can include software, firmware and/or hardware for carrying out an embodiment of the invention. The kit can also contain instructions for practicing an embodiment of the invention. Unless otherwise specified, the components, software, firmware, hardware and/or instructions of the kit can be the same as those used in an embodiment of the invention.

Embodiments of the invention, can be cost effective and advantageous for at least the following reasons. The invention enables longer range communications. The invention justifies accounting the capital costs of the components to more subscribers. The invention avoids loss of fidelity. The invention permits targeting data to particular subscribers. Embodiments of the invention improves quality and/or reduces costs compared to previous approaches.

The term plurality is defined as two or more than two. The term another is defined as at least a second or more. The terms "consisting" (consists, consisted) and/or "composing" (composes, composed) are defined as close language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the terms "consisting" (consists, consisted) and/or "composing" (composes, composed), is defined as modified close language that leaves the recited method, apparatus and/or composition open only for the inclusion of unspecified procedure(s), structure(s) and/or ingredient(s) which do not materially affect the basic novel characteristics of the recited method, apparatus and/or composition. The term coupled is defined as connected, although not necessarily directly, and not necessarily mechanically. The term proximate, as used herein, is defined as close, near adjacent and/or coincident; and includes spatial situations where the specified functions and/or results can be carried out and/or achieved. The phrase radio frequency, as used herein, is defined as including infrared, as well as frequencies less than or equal to approximately 300 GHz.

The term any is defined as all applicable members of a set or at least a subset of all applicable members of the set. The term approximately is defined as at least close to a given value (e.g., within 10% of). The term substantially is defined as largely but not necessarily wholly that which is specified. The term generally is defined as at least approaching a given state. The term deploying is defined as designing, building, shipping, installing and/or operating. The term means, when followed by the term "for" as used herein, is defined as hardware, firmware and/or software for achieving a result. The terms program or computer program are defined as a sequence of instructions designed for execution on a computer system (e.g., a program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. In addition, the materials, methods, and examples are illustrative only and not intended to be limiting.

All the disclosed embodiments of the invention disclosed herein can be made and used without undue experimentation in light of the disclosure. An embodiment of the invention is not limited by theoretical statements recited herein. Although the best mode of carrying out embodiments of the invention contemplated by the inventor(s) is disclosed, practice of an embodiment of the invention is not limited thereto. Accordingly, it will be appreciated by those skilled in the art that an embodiment of the invention may be practiced otherwise than as specifically described herein.

It will be manifest that various substitutions, modifications, additions and/or rearrangements of the features of an embodiment of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   receiving a forward baseband digital optical signal, including a plurality of frequency octaves, from an optical fiber at a forward baseband digital optical signal receiver;
   baseband/wideband converting the forward baseband digital optical signal to a forward analog electrical signal with a forward circuit;
   transmitting the forward analog electrical signal on an electrical conductor with a forward analog electrical signal transmitter;
   receiving a reverse analog electrical signal on the electrical conductor with a reverse analog electrical signal receiver;
   converting the reverse analog electrical signal to a reverse digital baseband optical signal with a reverse circuit; and
   transmitting the reverse digital baseband optical signal with a reverse baseband digital transmitter,
   wherein baseband/wideband converting the forward baseband digital optical signal to the forward analog electrical signal includes combining a first subdivided portion and a second subdivided portion.

2. The method of claim 1, wherein a same extended bandwidth reverse chip that transforms the reverse analog electrical signal to the reverse digital baseband optic signal also transforms the forward baseband digital optical signal, including a plurality of frequency octaves, to the forward analog electrical signal.

3. The method of claim 1, wherein the first sub-divided portion and the second subdivided portion are defined by at least one member selected from the group consisting of under sampling, space division multiplexing, frequency down conversion and broadband conversion.

4. The method of claim 1, wherein at least one of the first sub-divided portion and the second subdivided portion are substantially equal to a bandwidth of the reverse digital baseband optical signal.

5. The method of claim 1, wherein the forward baseband digital optical signal includes at least one member selected from the group consisting of a packet based data stream and a frame based data stream.

6. The method of claim 1, wherein receiving the forward baseband digital optical signal, transforming the forward baseband digital optical signal, transmitting the forward analog electrical signal, receiving the reverse analog electrical signal, transforming the reverse analog electrical signal and transmitting the reverse digital baseband optical signal are implemented within a minifibernode.

7. The method of claim 6, further comprising receiving the reverse digital baseband optical signal at another minifibernode.

8. The method of claim 1, wherein transforming the forward baseband digital optical signal to the forward analog electrical signal includes modulating the forward analog electrical signal using carrier based quadrature phase shift keying.

9. The method of claim 1, wherein transmitting the forward baseband digital optical signal includes transmitting from at least one member selected from the group consisting of a headend, a hub and a supermux.

10. The method of claim 9, further comprising dense wavelength demultiplexing the forward baseband digital optical signal before transmitting the forward baseband digital optical signal.

11. An apparatus, comprising:
    a forward baseband digital optical signal receiver that receives a forward baseband digital optical signal, including a plurality of frequency octaves, from an optical fiber;
    a forward circuit coupled to the forward baseband digital optical signal receiver, the forward circuit baseband/wideband converting a forward baseband digital optical signal to a forward analog electrical signal;
    a forward analog electrical signal transmitter coupled to the forward circuit;
    a reverse analog electrical signal receiver;
    a reverse circuit coupled to the reverse analog electrical signal receiver, the reverse circuit converting a reverse analog electrical signal to a reverse digital baseband optical signal; and
    a reverse baseband digital transmitter coupled to the reverse circuits,
    wherein the forward circuit combines a first sub-divided portion and a second subdivided portion from the forward baseband digital optical signal.

12. The apparatus of claim 11, wherein a same extended bandwidth reverse chip that transforms the reverse analog electrical signal to the reverse digital baseband optic signal also transforms the forward baseband digital optical signal, including a plurality of freauencv octave, to the forward analog electrical signal.

13. The apparatus of claim 11 wherein the first sub-divided portion and the second subdivided portion are defined by at least one member selected from the group consisting of under sampling, space division multiplexing, frequency down conversion and broadband conversion.

14. The apparatus of claim 11 wherein at least one of the first sub-divided portion and the second subdivided portion are substantially equal to a bandwidth of the reverse baseband digital transmitter.

15. The apparatus of claim 11, wherein the forward circuit recovers at least one member selected from the group consisting of a packet based data stream and a frame based data stream from the forward baseband digital optical signal.

16. The apparatus of claim 11, wherein the apparatus does not include a baseband analog receiver or a baseband analog transmitter.

17. The apparatus of claim 11, further comprising at least one member selected from the group consisting of a headend, a hub and a supermux coupled to at least one member selected from the group consisting of the baseband digital receiver and the baseband digital transmitter.

18. The apparatus of claim 17, wherein the at least one member selected from the group consisting of the headend, the hub and the supermux includes a dense wavelength division demultiplexer.

19. The apparatus of claim 11, located within a minifibernode.

20. The apparatus of claim 19, further comprising another minifibernode coupled to the reverse baseband digital transmitter.

21. The apparatus of claim 19, wherein the forward analog electrical signal is modulated using carrier based quadrature phase shift keying.

22. A cable television network, comprising the apparatus of claim 11.

* * * * *